United States Patent [19]

Meinke

[11] 4,361,586

[45] Nov. 30, 1982

[54] VACUUM ENZYMATIC DIGESTION OF PROTEIN MATERIAL

[76] Inventor: Wilmon W. Meinke, 306 Crescent Dr., Bryan, Tex. 77801

[21] Appl. No.: 300,653

[22] Filed: Sep. 9, 1981

Related U.S. Application Data

[63] Continuation-in-part of Ser. No. 206,050, Nov. 12, 1980, abandoned, which is a continuation of Ser. No. 106,311, Dec. 21, 1979, abandoned, which is a continuation-in-part of Ser. No. 11,710, Feb. 12, 1979, abandoned.

[51] Int. Cl.³ .................. A23J 1/04; A23L 1/325
[52] U.S. Cl. ......................... 426/7; 426/59; 426/486; 426/488; 435/69
[58] Field of Search ................. 426/7, 55, 56, 58, 59, 426/486, 488

[56] References Cited

U.S. PATENT DOCUMENTS

| | | | |
|---|---|---|---|
| 3,041,174 | 6/1962 | Ehlert | 426/7 |
| 3,547,652 | 12/1970 | Jeffreys | 426/7 |
| 3,561,973 | 2/1971 | Rutman | 426/7 |
| 3,697,285 | 10/1972 | Faith, Jr. et al. | 426/7 |
| 3,787,596 | 1/1974 | Pavia et al. | 426/488 |
| 3,924,005 | 12/1975 | Bosund et al. | 426/7 |
| 3,928,630 | 12/1975 | Perini | 426/7 |
| 4,016,295 | 4/1977 | Burrows et al. | 426/7 X |

FOREIGN PATENT DOCUMENTS

| | | | |
|---|---|---|---|
| 2253466 | 8/1975 | France | 426/488 |
| 424134 | 2/1935 | United Kingdom | 426/7 |

*Primary Examiner*—Robert A. Yoncoski
*Attorney, Agent, or Firm*—Roy, Kiesel, Patterson & McKay

[57] ABSTRACT

An improved process for enzymatic hydrolysis of mammal, fish and plant protein containing material characterized by the utilization of vacuum conditions during the hydrolyzing phase of the process to selectively remove the odoriferous compounds.

7 Claims, No Drawings

VACUUM ENZYMATIC DIGESTION OF PROTEIN MATERIAL

RELATED APPLICATIONS

This application is a continuation-in-part of U.S. patent application Ser. No. 206,050, now abandoned, by the same title and inventor filed on Nov. 12, 1980 which application was a continuation of U.S. patent application Ser. No. 106,311, now abandoned, by the same title and inventor which was filed on Dec. 21, 1979, which application was a continuation-in-part of U.S. patent application Ser. No. 011,710, now abandoned, entitled "Vacuum Enzymatic Digestion of Protein Material" and filed Feb. 12, 1979 by the inventor herein, mention of which is made to obtain benefit of its earlier filing date.

BACKGROUND OF THE INVENTION

1. Field of the Invention

This invention relates to enzymatic hydrolysis of mammal, fish and plant protein containing material to produce a protein concentrated product.

2. Prior Art

Extensive research has been conducted over the past thirty years to develop a commercially attractive process for enzymatically treating protein containing material such as fish, meat, vegetables, grain, and their by-products. Examples of such processes are described in U.S. Pat. Nos. 2,098,923; 2,180,637; 2,958,630; 3,041,174; 3,547,652; 3,561,973; 3,697,285; 3,761,353; 3,787,596; 3,924,005; 3,928,630 and 4,016,295. However, despite the past efforts, no one has been able to selectively remove those compounds formed during enzymatic hydrolysis which adversely effect the odor and taste of the protein concentrate formed. Therefore, the desire for a more palatable product, i.e., odorless and tasteless, still very much exists. In fact, the undesirable odor and taste in most of the protein concentrate produced commercially have prevented the use of the concentrate as a food supplement for people.

The enzymatic hydrolysis process of this invention should not be confused with fermentation material treatment processes such as that disclosed in French Pat. No. 2,253,466 which is directed toward treatment of an already formed fermentation product rather than a process for producing a concentrated protein product by enzymatic hydrolysis. Nor should this process be confused with processes such as that disclosed in British Pat. No. 424,134 directed toward a process to concentrate volatile organic compounds (e.g. alcohol) formed during fermentation. In this process it is object to produce the volatile compounds without regard to the effect on the substrate.

In addition to quality control problems prevalent in present commercial process, the pollution control treatment of the waste water effluent has become more severe and costly as government guidelines and legal limits have been set.

SUMMARY OF THE INVENTION

Therefore, it is an object of this invention to provide an enzymatic hydrolysis process for treating certain protein containing material to produce an edible protein concentrate material.

Another object of this invention is to provide a method for enzymatically hydrolyzing certain protein containing material to produce an edible, basically odorless and tasteless protein concentrate.

Still another object of this invention is to provide an improved hydrolyzing phase of an enzymatic, hydrolyzing certain protein treatment process which reduces the odor and taste of the protein concentrate product.

Yet another object of this invention is to provide oxidative changes and/or destruction of the protein containing materials during enzymatic digestion in order to prevent deleterious odor and taste characteristics of the protein concentrate product.

A further object of this invention is to provide an enzymatic hydrolysis material treatment process to produce protein concentrate material which reduces pollution control treatment of the waste water effluent.

Other objects and advantages of this invention will become apparent from the ensuing descriptions of the invention.

Accordingly, a process for enzymatic hydrolysis of certain protein containing material to produce a protein concentrate is provided comprising the steps, first, of contacting in a reaction vessel under partial vacuum condition an enzyme with a protein containing material in an aqueous solution having a pH and temperature adjusted to a level satisfactory for achieving enzyme digestion of the protein containing material for a period of time to achieve the degree of enzymatic hydrolysis desired to produce an aqueous digest product, undigested residue solids product and a vapor stream, next, removing the vapor stream from the reaction vessel, adjusting the pH of the remaining mixture of aqueous digest product and undigested residue solids product in the reaction vessel to a level of 6 to 8, elevating the temperature in the reaction vessel to a level necessary to deactivate the enzyme, and then separating the liquid protein rich digest product from the undigested residue solids product.

PREFERRED EMBODIMENTS OF THE INVENTION

In a conventional enzymatic hydrolysis process, the protein containing material, e.g., fish, meat or by-products thereof, is prepared, such as by chopping, grinding, etc., and mixed in an aqueous solution whose pH, i.e., acidic, neutral or basic, is dependent upon the enzyme chosen for the digestion step of the process. The enzymes are then added to the digesting medium and maintained in contact with the digestive medium at atmospheric pressure at a temperature between 30°–70° C. and for a time period of 1–24 hours, depending upon the quality of protein product desired. In a preferred embodiment, the mixture is stirred or agitated to enhance the contact between the enzymes and protein containing materials. However, during this digesting step, various compounds are formed or are present in original protein material which affect the odor and taste of the final protein product, which cannot be removed by the present filtering and drying steps now used by the industry. It has now been discovered that by applying vacuum conditions during the digesting step, a substantial portion of the odor and taste affecting compounds can be selectively removed prior to the subsequent filtering and drying steps without affecting the enzyme action or destroying the protein concentrate product in addition, it is possible by this process to concentrate a major portion of those undesirable pollutants in an easily recoverable vapor stream.

Without any intent to limit the scope of this invention, the preferred embodiments will be illustrated with the use of fish and/or fish by-products as the protein containing material.

The whole fish and/or fish by-products are first comminuted into small pieces, preferably less than one-half inch, more preferably one-eighth-one-fourth inches, to enhance later contact with the enzyme chosen. Then, within a reaction vessel, the ground-up product is mixed with water, preferably in a volume ratio of 4:1–1:10 fish to water, more preferably, 1:1–2:1 to form an aqueous solution. In another preferred embodiment, the water is preheated to 120°–170° F. before mixing with comminuted fish pieces which are at temperatures of 40° F. up to ambient temperatures. This mixture is then agitated and sufficient alkaline compounds (if an alkaline operating enzyme is used), preferably NaOH, KOH, CaO, Ca(OH)$_2$ Na$_2$CO$_3$ or CaCO$_3$, is added to produce a mixture having a pH in the range of 7.5 to 9.5, preferably 8–9.5. The reaction vessel is then maintained at 85°–160° F., preferably about 120°–140° F., and under a vacuum of preferably 5–26 inches of mercury. The desired enzyme of animal, vegetable, bacterial or fungal origin, or mixtures thereof, preferably alkaline proteins of bacterial origin (Bacillus subtilis), which are generally recognized as safe, is added, preferably ½–8 pounds per ton of fish pieces, more preferably 2–3 pounds per ton of fish pieces, to the alkaline solution and, preferably, mixed or agitated by a mechanical stirrer for the desired period of time, i.e., preferably, one hour or more, and more preferably, 1–24 hours, while maintaining the temperature, vacuum and pH condition. The time of digestion will depend on the type of protein concentrate desired (i.e., the length of amino acid chain), the enzyme chosen, the feedstock and other variables.

During this digestion phase, the vapor stream produced is removed by the vacuum, leaving a mixture of an aqueous protein rich digest product and an undigested residue solids product. Once the desired digestion time has elapsed, the pH of the remaining mixture is adjusted to a level of 6–8, and the temperature in the reaction vessel is raised to a level sufficient to inactivate the enzymes, preferably, 170°–190° F. for a period of 15–30 minutes. Next, the aqueous protein rich digest product is separated from the undigested residue solids by filtering or other means.

In a preferred embodiment, the separated aqueous protein rich digest product is treated to remove sufficient water to form a biologically stable product. In this embodiment, it is preferred that sufficient water be removed to produce a concentrate having a 65% or greater water activity.

In another preferred feature, the vapor stream drawn off by the vacuum condition during the digesting step are passed through a condenser to produce a low volume concentrate of condensate that can more easily be treated to remove various pollutants formed, or released, during the digesting phase.

EXAMPLE

Gulf Coast Trawl fish (1.1 lbs.) were comminuted to ¼" and digested for 9 hours at pH9, 60° C. with a Rohm & Haas liquid alkaline enzyme at 5" Hg vacuum wherein ratio of fish to water was 2-1. Three distillate cuts (DD1, DD2 and DD3) are collected after 3, 6 and 9 hours respectively and assayed. One hundred grams of water was then added to the digest and pH adjusted to 7 with the addition of H$_3$PO$_4$. The pH 7 digest was filtered and rinsed with three 50 ml aliquots of water and 60° C. The resulting filtrate was evaporated at 24-26" Hg vacuum to yield a 70% FPH concentrate and a distillate CD4. The assays yielded the following results:

| DISTILLATE | | | BOD | | 0.1M HCL to |
|---|---|---|---|---|---|
| No. | Yield (Gms) | PH | 5 day (lbs/100 tons) | 10 day (lbs/100 tons) | adjust to pH 7 |
| DD1 | 104 | 9.7 | | | 10.41 |
| DD2 | 46 | 9.5 | 16.7 | 21.9 | 7.25 |
| DD3 | 100 | 9.5 | | | 2.85 |
| CD4 | 645 | 9.5 | 4 | 5.4 | 2.70 |

Since distillate cuts DD1, DD2 and DD3 are representative of the BOD removed during digestion, it is clear that substantial additional amounts of BOD are removed during vacuum digestion. Secondly, it is clear that with the use of a vacuum during digestion that more of the BOD removal can be concentrated in the vapors given off during digestion where the vapors can be more efficiently treated to reduce water effluent problems. Furthermore, since distillate cut CD4 is similar to that obtained when no vacuum is employed, it is seen that the amount of BOD removal is substantially greater when utilizing vacuum conditions during digesting the feedstock.

There are, of course, many obvious alternate embodiments and modifications of the specific process disclosed which are intended to be included within the scope of this invention as defined by the following claims.

What I claim is:

1. A process for enzymatic hydrolysis of animal or vegetable protein containing matter to produce a protein concentrate product comprising:
   (a) contacting in a reaction vessel under 5–26" Hg vacuum enzymes and said protein containing matter which has been comminuted to ½" or less diameter in a weight ratio of 0.00025–0.004 in an aqueous solution having a pH and temperature adjusted to achieve enzymatic hydrolysis of said protein containing matter to produce an aqueous protein rich digest product, undigested residue solids product and a vapor stream;
   (b) removing said vapor stream from said reaction vessel;
   (c) adjusting pH of the remaining mixture of aqueous digest product and undigested residue solids product in said reaction vessel to a level of 6 to 8;
   (d) elevating said temperature in said reaction vessel to a level necessary to deactivate said enzymes; and
   (e) separating said aqueous digest from said undigested residue solids to obtain an aqueous digest stream.

2. A process according to claim 1 wherein said contacting of said enzyme and said protein containing matter is for a period of time equal to or greater than one hour.

3. A process according to claim 3 wherein said enzyme and said protein containing matter are stirred during said contacting.

4. A process according to claim 1 wherein said protein containing matter is fish or fish by-products and wherein an alkaline reagent is added to said reaction vessel during said contacting in an amount to raise the pH to 7.5–9.5.

5. A process according to claim 5 wherein said alkaline reagent is either NaOH, KOH, CaO, Ca(OH)$_2$, Na$_2$CO$_3$ CaCO$_3$ or mixtures thereof.

6. A process according to claim 1 wherein said aqueous protein rich digest stream is heated to remove by evaporation a sufficient amount of water to obtain a biologically stable protein concentrate.

7. A process according to claim 1 wherein said vapor stream is cooled to produce a condensate separate from said mixture of aqueous digest and undigested residue solids.

* * * * *